United States Patent
Liu

(10) Patent No.: US 11,438,852 B2
(45) Date of Patent: Sep. 6, 2022

(54) METHOD AND DEVICE FOR DETERMINING TIME OF TRANSMITTING SYNCHRONIZATION BLOCK, USER EQUIPMENT AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 265 days.

(21) Appl. No.: 16/704,230

(22) Filed: Dec. 5, 2019

(65) Prior Publication Data
US 2020/0187135 A1 Jun. 11, 2020

Related U.S. Application Data

(63) Continuation of application No. PCT/CN2017/088616, filed on Jun. 16, 2017.

(51) Int. Cl.
| | |
|---|---|
| *H04W 56/00* | (2009.01) |
| *H04L 27/26* | (2006.01) |
| *H04W 24/08* | (2009.01) |
| *H04W 72/00* | (2009.01) |
| *H04W 72/04* | (2009.01) |

(52) U.S. Cl.
CPC ....... *H04W 56/001* (2013.01); *H04L 27/2656* (2013.01); *H04W 24/08* (2013.01);
(Continued)

(58) Field of Classification Search
CPC . H04W 56/001; H04W 24/08; H04W 72/005; H04W 72/046; H04W 72/0466; H04L 27/2656
See application file for complete search history.

(56) References Cited

U.S. PATENT DOCUMENTS

| | | |
|---|---|---|
| 2012/0198305 A1 | 8/2012 | Abu-Surra et al. |
| 2015/0163800 A1 | 6/2015 | Kim et al. |
| | (Continued) | |

FOREIGN PATENT DOCUMENTS

| | | |
|---|---|---|
| CN | 101350704 A | 1/2009 |
| CN | 102271023 A | 12/2011 |
| | (Continued) | |

OTHER PUBLICATIONS

India 1st Office Action in Application No. 201927053203, dated Mar. 24, 2021.

(Continued)

*Primary Examiner* — Eric Myers
(74) *Attorney, Agent, or Firm* — Syncoda LLC; Feng Ma

(57) ABSTRACT

A method for determining a sending time of a synchronization block includes: performing descrambling and decoding on a PBCH message carried in the synchronous block, and buffering PBCH symbol data of the PBCH message before demodulation; after the descrambling succeeds and the decoding fails, acquiring PBCH symbol data to be merged, which are same as buffered PBCH symbol data. The PBCH symbol data to be merged include PBCH symbol data of a beam where the synchronous block is located and PBCH symbol data of an adjacent beam in a PBCH merge period; and merging the buffered PBCH symbol data and the PBCH symbol data to be merged until the PBCH symbol data can be correctly decoded. The sending time of the synchronous block and the system frame number can be effectively indicated in the 5G system, and merging PBCH symbol data can be realized without increasing UE complexity.

15 Claims, 8 Drawing Sheets

(52) U.S. Cl.
CPC ....... *H04W 72/005* (2013.01); *H04W 72/046* (2013.01); *H04W 72/0466* (2013.01)

(56) References Cited

U.S. PATENT DOCUMENTS

| | | | |
|---|---|---|---|
| 2017/0094624 | A1 | 3/2017 | Balachandran et al. |
| 2018/0302904 | A1* | 10/2018 | Li ................. H04W 72/005 |
| 2020/0059895 | A1* | 2/2020 | Atungsiri ............ H04L 5/0048 |

FOREIGN PATENT DOCUMENTS

| | | |
|---|---|---|
| CN | 102549954 A | 7/2012 |
| CN | 103782636 A | 5/2014 |
| EP | 2754321 A2 | 7/2014 |

OTHER PUBLICATIONS

MCC Support, Final Report of 3GPP TSG RAN WG1 #82 v10.0 (Beijing, China, Aug. 24-28, 2015), R1-155022, Malmo, Sweden, Oct. 5-9, 2015.
CN First Office Action in Application No. 201780000502.6, dated Nov. 12, 2020.
XiaoMi Technology, Discussion on NR-PBCH combining (R1-1709026), XP051274185, 3GPP TSG RAN WG1 Meeting #89, Hangzhou, P. R. China, May 15-19, 2017.
Partial Supplementary European Search Report in Application No. 17913134.7, dated Nov. 26, 2020.
International Search Report in Application No. PCT/CN2017/088616, dated Nov. 1, 2017.

* cited by examiner

METHOD AND DEVICE FOR DETERMINING TIME OF TRANSMITTING SYNCHRONIZATION BLOCK, USER EQUIPMENT AND BASE STATION

CROSS-REFERENCE TO RELATED APPLICATION

This is a continuation of International Application No. PCT/CN2017/088616 filed on Jun. 16, 2017, the disclosure of which is hereby incorporated by reference in its entirety.

BACKGROUND

In the 5th Generation mobile communication technologies (5G) project, a synchronization configuration scheme is introduced for realizing symbol synchronization and frame synchronization of a user equipment (UE) based on a synchronization block and a synchronization block set of beam scanning. In the synchronization configuration scheme, all synchronization blocks in a synchronization block set period of 20 ms at the longest need to be sent out within 5 ms, each synchronization block carries a physical broadcast channel (PBCH) message, and a transmission time interval (TTI) of the PBCH message is agreed well.

SUMMARY

The present disclosure relates generally to the technical field of wireless communications, and more specifically to a method and a device for determining a sending time of a synchronization block, a user equipment, and a base station.

Various embodiments of the present disclosure provide a method and a device for determining a sending time of a synchronization block, a user equipment, and a base station, so as to effectively indicate a TI and a system frame number of the synchronization block.

According to a first aspect of an embodiment of the present disclosure, a method for determining a sending time of a synchronization block is provided, including:
performing descrambling and decoding processing on PBCH message carried in the synchronous block, and buffering PBCH symbol data of the PBCH message before demodulation;
acquiring PBCH symbol data to be merged which is the same as buffered PBCH symbol data after the descrambling succeeds and the decoding fails, wherein the PBCH symbol data to be merged includes PBCH symbol data of a beam which is the same as the beam where the synchronous block is located and PBCH symbol data of an adjacent beam in a PBCH merge period; and
merging the buffered PBCH symbol data and the PBCH symbol data to be merged until the PBCH symbol data can be correctly decoded.

In some embodiments, the acquiring PBCH symbol data to be merged which is the same as buffered PBCH symbol data includes:
determining an occurrence position of the synchronous block signal in the PBCH merge period based on a scrambling code of the PBCH message;
determining the PBCH symbol data to be merged which is the same as the buffered PBCH symbol data in the PBCH merge period, based on the occurrence position; and
monitoring the PBCH symbol data to be merged in a sending window of the PBCH symbol data to be merged.

In some embodiments, the merging the buffered PBCH symbol data and the PBCH symbol data to be merged includes:
acquiring PBCH symbol data of an adjacent beam located in the same synchronous block set as the synchronous block;
merging the buffered PBCH symbol data and the PBCH symbol data of the adjacent beam located in the same synchronous block set as the synchronous block, after acquiring the PBCH symbol data of the adjacent beam in the same synchronous block set;
decoding merged PBCH symbol data; and
merging and decoding the merged PBCH symbol data and PBCH symbol data to be merged in the next synchronous block set in the PBCH merge period until the decoding succeeds or there is no PBCH symbol data capable of being merged in the PBCH merge period in a case where the decoding fails.

In some embodiments, when the scrambling code bits are 2 bits system frame number bits and a 1-bit timing index bit of the synchronization block, the PBCH merge period is 80 ms.

In some embodiments, when the scrambling code bits are 1-bit system frame number bits and 1-bit timing index bit of the synchronization blocks, the PBCH merge period is 40 ms.

In some embodiments, before the performing descrambling and decoding processing on PBCH message carried in the synchronous block, the method further includes:
monitoring the synchronization block; and
completing symbol synchronization based on the primary synchronization signal and the secondary synchronization signal after monitoring the synchronization block.

In some embodiments, the PBCH symbol data includes high N bits and a first low data bit of a system frame number and high P bits of the timing index bits of the synchronization block, where N is 7 or 8, and P is a natural number not greater than 5.

According to a second aspect of an embodiment of the present disclosure, a method for determining a sending time of a synchronization block is provided, including:
scrambling and modulating coded PBCH symbol data based on an agreed scrambling code to obtain a PBCH message, wherein the PBCH symbol data includes high N bits and a first low data bit of a system frame number and high P bits of timing index bits of the synchronization block, where P is a natural number not greater than 5; and
sending the synchronous block based on a preset sending mode, wherein the synchronous block carries the PBCH message.

In some embodiments, the sending the synchronous block based on a preset sending mode includes:
sending the synchronization blocks based on a first agreed mode, wherein the first agreed mode is used for indicating that the synchronization blocks in each direction is sent based on a punching mode; or,
sending the synchronization block based on a second agreed mode, wherein the second agreed mode is used for indicating that the synchronization block is sent in each direction in each synchronization block sending period.

In some embodiments, N is 7 or 8.

According to a third aspect of an embodiment of the present disclosure, a device for determining a sending time of a synchronization block is provided, including:
a first processing module, configured to perform descrambling and decoding processing on a PBCH message carried in the synchronization block, and buffer PBCH symbol data of the PBCH message before demodulation;

a data acquisition module, configured to acquire PBCH symbol data to be merged which is the same as buffered PBCH symbol data after the descrambling performed by the first processing module succeeds and the decoding performed by the first processing module fails, wherein the PBCH symbol data to be merged includes PBCH symbol data of a beam which is the same as the beam where the synchronous block is located and PBCH symbol data of an adjacent beam in a PBCH merge period; and a merging module, configured to merge the buffered PBCH symbol data and the PBCH symbol data to be merged until the PBCH symbol data can be correctly decoded.

In some embodiments, the data acquisition module includes:

a position determination sub-module, configured to determine an occurrence position of the synchronous block signal in the PBCH merge period based on a scrambling code of the PBCH message;

a first determining sub-module, configured to determine the PBCH symbol data to be merged which is the same as the buffered PBCH symbol data in the PBCH merge period, based on the occurrence position; and a monitoring sub-module, configured to monitor the PBCH symbol data to be merged in a sending window of the PBCH symbol data to be merged.

In some embodiments, the merge module includes:

an acquisition sub-module, configured to acquire PBCH symbol data of an adjacent beam located in the same synchronous block set as the synchronous block;

a first merging sub-module, configured to merge the buffered PBCH symbol data and the PBCH symbol data of the adjacent beam located in the same synchronous block set as the synchronous block after acquiring the PBCH symbol data of the adjacent beam in the same synchronous block set;

a decoding sub-module, configured to decode the PBCH symbol data merged by the first merging sub-module; and a second merging sub-module, configured to merge and decode the merged PBCH symbol data and PBCH symbol data to be merged in the next synchronous block set in the PBCH merge period until the decoding succeeds or there is no PBCH symbol data capable of being merged in the PBCH merge period in a case where the decoding fails.

In some embodiments, when the scrambling code bits are 2 bits system frame number bits and a 1-bit timing index bit of the synchronization block, the PBCH merge period is 80 ms.

In some embodiments, when the scrambling code bits are 1-bit system frame number bits and 1-bit timing index bit of the synchronization blocks, the PBCH merge period is 40 ms.

In some embodiments, the device further includes:

a monitoring module, configured to monitor the synchronization block; and a symbol synchronization module, configured to complete symbol synchronization based on the primary synchronization signal and the secondary synchronization signal after the synchronization block is monitored by the monitoring module.

In some embodiments, the PBCH symbol data includes high N bits and a first low data bit of a system frame number and high P bits of the timing index bits of the synchronization block, where N is 7 or 8, and P is a natural number not greater than 5.

According to a fourth aspect of an embodiment of the present disclosure, a device for determining a sending time of a synchronization block is provided, including:

a second processing module, configured to perform scrambling and modulation processing on coded PBCH symbol data based on an agreed scrambling code to obtain a PBCH message, wherein the PBCH symbol data includes high N bits and a first low data bit of a system frame number and high P bits of timing index bits of the synchronization block, where P is a natural number not greater than 5; and a sending module, configured to send the synchronous block based on a preset sending mode, wherein the synchronous block carries the PBCH message.

In some embodiments, the sending module includes:

a first sending sub-module, configured to send the synchronization blocks based on a first agreed mode, wherein the first agreed mode is used for indicating that the synchronization blocks in each direction is sent based on a punching mode; or a second sending sub-module, configured to send the synchronization block based on a second agreed mode, wherein the second agreed mode is used for indicating that the synchronization block is sent in each direction in each synchronization block sending period.

In some embodiments, N is 7 or 8.

According to a fifth aspect of an embodiment of the present disclosure, a user equipment is provided, including:

a processor; and a memory for storing instructions executable for the processor;

wherein the processor is configured to:

perform descrambling and decoding processing on a PBCH message carried in the synchronous block, and buffer PBCH symbol data of the PBCH message before demodulation;

acquire PBCH symbol data to be merged which is the same as buffered PBCH symbol data after the descrambling succeeds and the decoding fails, wherein the PBCH symbol data to be merged includes PBCH symbol data of a beam which is the same as the beam where the synchronous block is located and PBCH symbol data of an adjacent beam in a PBCH merge period; and merge the buffered PBCH symbol data and the PBCH symbol data to be merged until the PBCH symbol data can be correctly decoded.

According to a sixth aspect of an embodiment of the present disclosure, a base station is provided, including:

a processor; and a memory for storing instructions executable for the processor;

wherein the processor is configured to:

perform scrambling and modulating processing on coded PBCH symbol data based on an agreed scrambling code to obtain a PBCH message, wherein the PBCH symbol data includes high N bits and a first low data bit of a system frame number and high P bits of timing index bits of the synchronization block, where P is a natural number not greater than 5; and send the synchronous block based on a preset sending mode, wherein the synchronous block carries the PBCH message.

According to a seventh aspect of an embodiment of the present disclosure, a non-transitory computer readable storage medium is provided, computer instructions stored thereon, and when the instructions are executed by a processor, the following steps are achieved:

performing descrambling and decoding processing on a PBCH message carried in the synchronous block, and buffer PBCH symbol data of the PBCH message before demodulation;

after the descrambling succeeds and the decoding fails, acquiring PBCH symbol data to be merged which is the same as buffered PBCH symbol data, wherein the PBCH symbol data to be merged includes PBCH symbol data of a beam which is the same as the beam where the synchronous block is located and PBCH symbol data of an adjacent beam in a PBCH merge period; and merging the buffered PBCH symbol data and the PBCH symbol data to be merged until the PBCH symbol data can be correctly decoded.

According to an eighth aspect of an embodiment of the present disclosure, a non-transitory computer readable storage medium is provided, computer instructions stored thereon, and when the instructions are executed by a processor, the following steps are achieved:

performing scrambling and modulating processing on coded PBCH symbol data based on an agreed scrambling code to obtain a PBCH message, wherein the PBCH symbol data includes high N bits and a first low data bit of a system frame number and high P bits of timing index bits of the synchronization block, where P is a natural number not greater than 5; and sending the synchronous block based on a preset sending mode, wherein the synchronous block carries the PBCH message.

It is to be understood that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present invention. The drawings along with the specification explain the principles of the present disclosure.

DETAILED DESCRIPTION

Various embodiments of the present disclosure will be described in further detail with reference to the accompanying drawings, to present the objects, technical solutions, and advantages of the embodiments more clearly.

The terminology used herein is for the purpose of describing particular examples only and is not intended to be limiting of examples. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

After receiving one synchronization block, the user equipment can implement a symbol-level timing based on a primary synchronization signal and a secondary synchronization signal in the synchronization block, but the user equipment cannot obtain from the synchronization signal, time index information about in which radio frame in a sending period of 20 ms, which specific time slot in a period of 5 ms of the radio frame or which sub-frame the synchronization block set transmits the synchronization block, or a timing index (TI) information of the synchronization block sent by the sub-frame. In a typical 5G environment, the user equipment is designed to obtain the synchronization information mainly through the PBCH message, but the PBCH resource is very limited, a technical solution for realizing the TI information and the system frame number indicating the synchronization block based on the PBCH message needs to be provided in the 5G system on the premise of not wasting the PBCH resource and not increasing the decoding complexity of the user equipment.

Figure 1A:
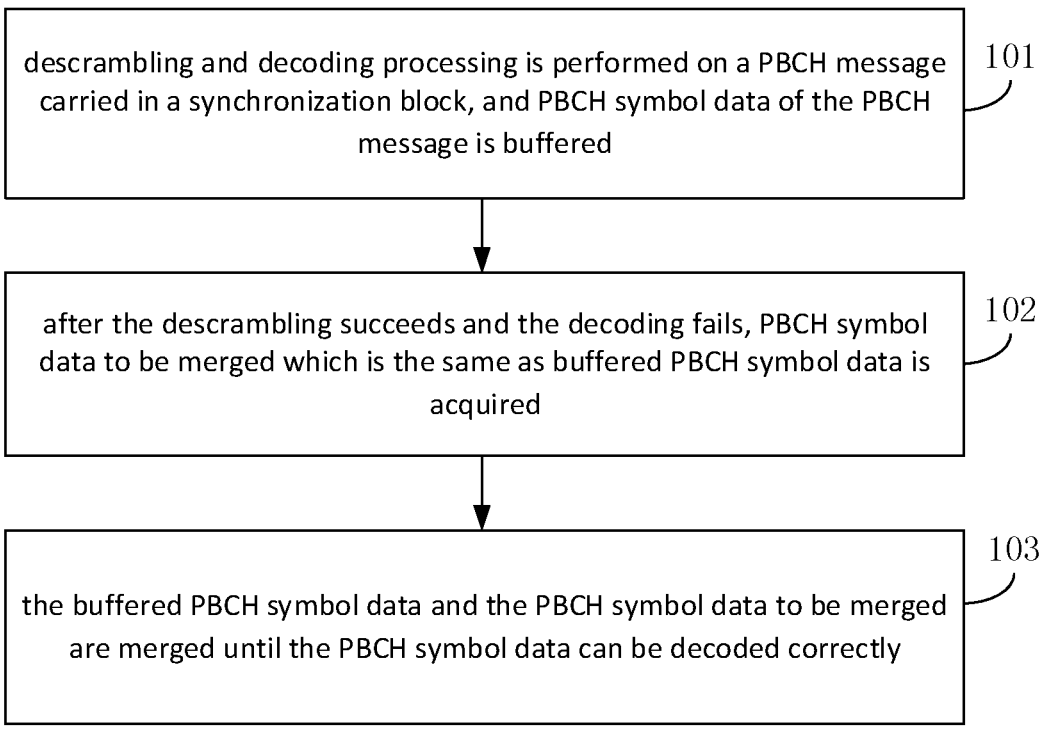
FIG. 1A is a flowchart illustrating a method for determining a sending time of a synchronization block according to an exemplary embodiment.
Figure 1B:
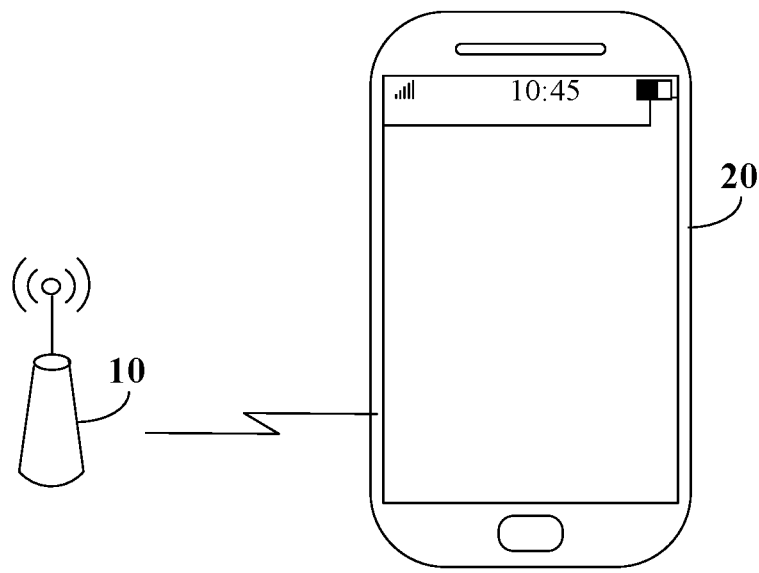
FIG. 1B is a scene diagram illustrating a method for determining a sending time of a synchronization block according to an exemplary embodiment.

FIG. 1A is a flowchart illustrating a method for determining a sending time of a synchronization block according to an exemplary embodiment, and FIG. 1B is a scene diagram illustrating a method for determining a sending time of a synchronization block according to an exemplary embodiment.

Figure 1C:
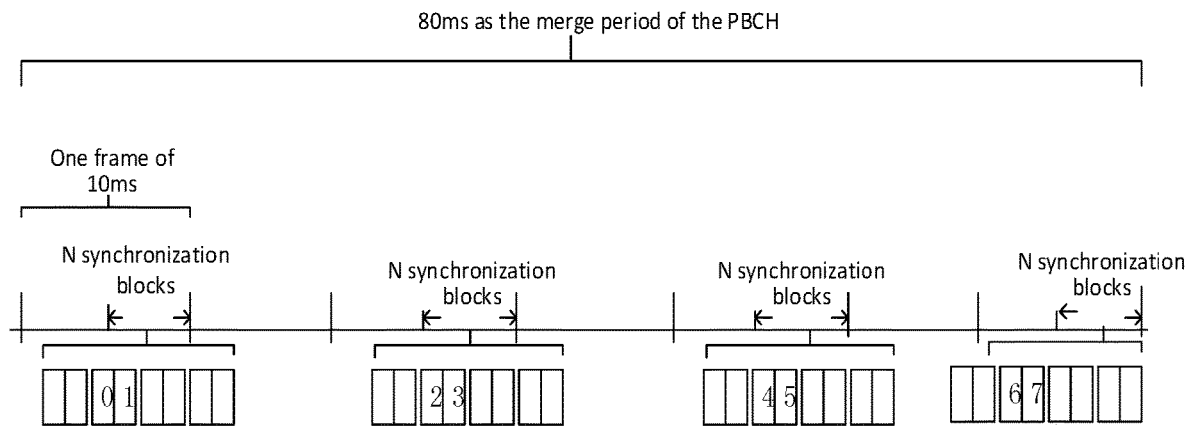
FIG. 1C is a first diagram illustrating a method for determining a sending time of a synchronization block according to an exemplary embodiment.
Figure 1D:
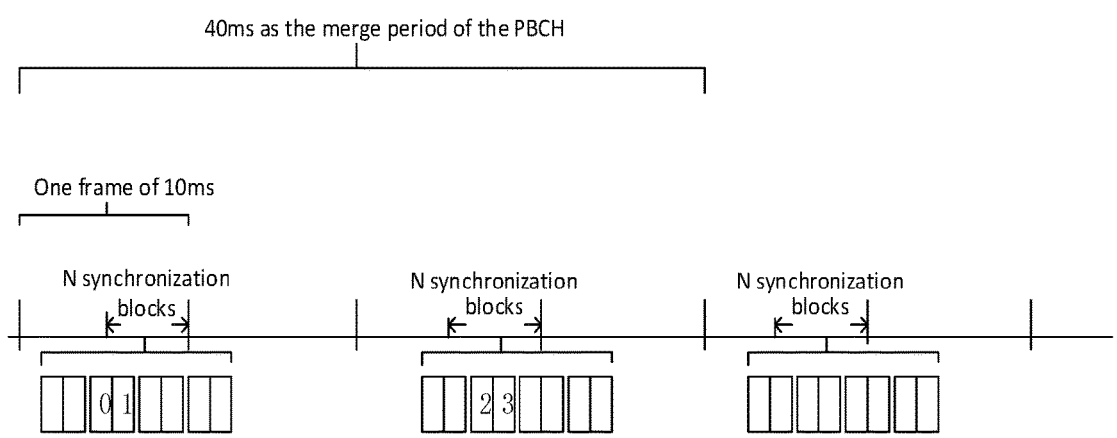
FIG. 1D is a second diagram illustrating a method for determining a sending time of a synchronization block according to an exemplary embodiment.
Figure 1E:
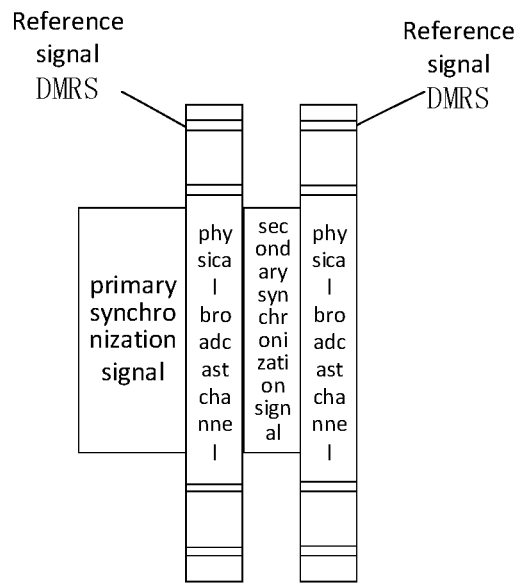
FIG. 1E is a schematic structural diagram illustrating a method for determining a sending time of a synchronization block according to an exemplary embodiment.

FIG. 1C is a first diagram illustrating a method for determining a sending time of a synchronization block according to an exemplary embodiment, FIG. 1D is a second diagram illustrating a method for determining a sending time of a synchronization block according to an exemplary embodiment, FIG. 1E is a schematic structural diagram illustrating a method for determining a sending time of a synchronization block according to an exemplary embodiment. The method for determining the sending time of the synchronization block can be applied to the user equipment. As shown in FIG. 1A, the method for determining a sending time of a synchronization block includes the following steps 101-103:

In step 101, descrambling and decoding processing is performed on a PBCH message carried in a synchronization block, and PBCH symbol data of the PBCH message is buffered.

In some embodiments, a structure of the synchronization block can be seen in FIG. 1E, which includes a primary synchronization signal, a secondary synchronization signal, the PBCH message, and a demodulation reference signal (DMRS for short) interleaved in a frequency domain.

In some embodiments, after descrambling the PBCH message, the obtained PBCH symbol data may be buffered before demodulation, wherein the PBCH symbol data includes high N bits and a first low data bit of a system frame number and high P bits of the timing index bits of the synchronization block, where N is 7 or 8.

In some embodiments, the sending time interval of the PBCH message carried in the synchronization block is 80 ms, and the PBCH message includes the high N bits and the first low data bit of the system frame number and the high P bits of the TI of the synchronization block. In addition to the high P bits of the TI of the synchronization block and the high N bits and the first low data bit of the system frame number explicitly displayed, other TI data bits and system frame number bits are implicit bits for scrambling the PBCH symbol data.

In some embodiments, P may take a natural number not greater than 5, and generally, in order to reduce the descrambling complexity for the UE, the higher the number of explicitly displayed TI bits is, the better, for example, when P takes a value of 5, the number of implicitly displayed TI bits is the first low data bit. In the present application, an alternative embodiment will be described below with P being 5, but the value of P is not limited to 5.

In some embodiments, when N is 7, the implicit bits may include 3 bits, which are the second and the third low data bits of the system frame number and the first low data bit of the time indication bit of the synchronization block. There are 8 possibilities for the implicit 3bits, and the scrambling codes may be 0, 1, 2, 3, 4, 5, 6, and 7, respectively, the PBCH merge period is 80 ms, which means there are four 20 ms, that is, 8 PBCH messages are the same in the 80 ms period. After the UE receives the synchronization block, the occurrence location of the synchronization block in the PBCH merge period may be determined based on the scrambling code that can successfully decode the PBCH message. Referring to FIG. 1C, which illustrates that the implicit bits are the second and the third low data bits of the system frame number and the first low data bit of the time indication bit of the synchronization block, the PBCH symbol data carried in the synchronous block marked by 0, 1, 2, 3, 4, 5, 6, and 7 in the figure is PBCH symbol data that can be used for merging. In FIG. 1C, the synchronization blocks 0-7 are distinguished by scrambling by eight scrambling codes, and the PBCH symbol data in the 8 synchronization blocks is identical. The UE can only solve 1 or 2 synchronization blocks in the synchronization blocks set, so the synchronization block needs a number identifier based on the scrambling code.

In some embodiments, when N is 8, the implicit bits may include 2 bits, which are the second low data bit of the system frame number and the first low data bit of the time indication bit of the synchronization block. There are 4 possibilities for the implicit 2bits, and the scrambling codes may be 0, 1, 2 and 3, respectively, the PBCH merge period is 40 ms, which means there are two 20 ms, that is, 4 PBCH messages are the same in the 40 ms period. After the UE receives the synchronization block, the occurrence location of the synchronization block in the PBCH merge period may be determined based on the scrambling code that can successfully decode the PBCH message. Referring to FIG. 1D, which illustrates that the implicit bits are the second low data bit of the system frame number and the first low data bit of the time indication bit of the synchronization block, the PBCH symbol data carried in the synchronous block marked by 0, 1, 2 and 3 in the figure is PBCH symbol data that can be used for merging. In FIG. 1D, the synchronization blocks 0-3 are distinguished by scrambling by four scrambling codes, and the PBCH symbol data in the 4 synchronization blocks is identical. The UE can only solve 1 or 2 synchronization blocks in the synchronization blocks set, so the synchronization block needs a number identifier based on the scrambling code.

In step 102, after the descrambling succeeds and the decoding fails, PBCH symbol data to be merged which is the same as buffered PBCH symbol data is acquired.

In some embodiments, the PBCH symbol data to be merged includes PBCH symbol data of a beam which is the same as the beam where the synchronous block is located and PBCH symbol data of an adjacent beam in a PBCH merge period. The system frame number of the PBCH symbol data to be merged and the TI of the corresponding synchronization block is the same as the buffered PBCH symbol data. For example, if the scrambling code of the buffered PBCH symbol data in FIG. 1C is 0, then the PBCH symbol data carried in the synchronization blocks with reference numbers 1-7 is the PBCH symbol data to be merged.

In step 103, the buffered PBCH symbol data and the PBCH symbol data to be merged are merged until the PBCH symbol data can be decoded correctly.

In some embodiments, the buffered PBCH symbol data may be first merged with the PBCH symbol data of the adjacent beam in the same synchronization block set. The PBCH symbol data labeled 0 and 1 in FIG. 1C is merged and then decoded, and if the decoding is still unsuccessful, then the PBCH symbol data is merged with the PBCH symbol data in the next 20 ms, such as PBCH symbol data labeled 2 and 3.

In some embodiments, as will be understood by those skilled in the art, the user equipment may not be able to monitor the synchronization blocks of the adjacent beams, and when the synchronization blocks of the adjacent beams cannot be monitored, only the PBCH symbol data carried by the synchronization blocks monitored under the same beam in the PBCH merge period may be merged.

In some embodiments, when the PBCH merge period is 80 ms, the base station may puncture the SSB transmission based on the requirement of power saving, that is, send the synchronization block once every transmission period in a certain direction, referring to FIG. 1C, in a certain direction, only the synchronization blocks labeled 0, 1, 4, and 5 may be sent, and on this premise, in the 80 ms PBCH period, the user equipment may still perform the combining operation of the PBCH symbol data.

In an exemplary scenario, as shown in FIG. 1B, in the scenario shown in FIG. 1B, the base station 10 and the user equipment (e.g. a smart phone, a tablet computer, etc.) 20 are included, wherein the base station 10 may carry the high N bits and a first low data bit of the system frame number and the high P bits of the timing index bits of the synchronization block in PBCH symbol data of a synchronization block, where N is 7 or 8, so that the user equipment 20 may obtain PBCH symbol data to be merged based on the scrambling code when decoding the PBCH fails after receiving the synchronization block. Since the number of the scrambling code bits can be at least two or three bits, it is achieved that the TI and the system frame number of the synchronization block are effectively indicated by the PBCH symbol data, and the descrambling complexity for the user equipment is not increased greatly on the basis of achieving the decoding the merged PBCH symbol data.

Through the above steps 101-103, the present embodiment can achieve that the TI and the system frame number of the synchronization block are effectively indicated by the PBCH symbol data, and the descrambling complexity for the user equipment is not increased greatly on the basis of achieving the decoding the merged PBCH symbol data.

In some embodiments, the acquiring PBCH symbol data to be merged which is the same as buffered PBCH symbol data includes:

determining an occurrence position of the synchronous block signal in the PBCH merge period based on a scrambling code of the PBCH message;

determining the PBCH symbol data to be merged which is the same as the buffered PBCH symbol data in the PBCH merge period, based on the occurrence position; and monitoring the PBCH symbol data to be merged in a sending window of the PBCH symbol data to be merged.

In some embodiments, the merging the buffered PBCH symbol data and the PBCH symbol data to be merged includes:

acquiring PBCH symbol data of an adjacent beam located in the same synchronous block set as the synchronous block;

after acquiring the PBCH symbol data of the adjacent beam in the same synchronous block set, merging the buffered PBCH symbol data and the PBCH symbol data of the adjacent beam located in the same synchronous block set as the synchronous block;

decoding merged PBCH symbol data; and merging and decoding the merged PBCH symbol data and PBCH symbol data to be merged in the next synchronous block set in the PBCH merge period until the decoding succeeds or there is no PBCH symbol data capable of being merged in the PBCH merge period in a case where the decoding fails.

In some embodiments, when the scrambling code bits are 2 bits system frame number bits and a 1-bit timing index bit of the synchronization block, the PBCH merge period is 80 ms.

In some embodiments, when the scrambling code bits are 1-bit system frame number bits and 1-bit timing index bit of the synchronization blocks, the PBCH merge period is 40 ms.

In some embodiments, before the performing descrambling and decoding processing on PBCH message carried in the synchronous block, the method for determining the sending time of the synchronization block may further include:

monitoring the synchronization block;

after monitoring the synchronization block, completing symbol synchronization based on the primary synchronization signal and the secondary synchronization signal.

In some embodiments, the PBCH symbol data includes high N bits and a first low data bit of a system frame number and high P bits of the timing index bits of the synchronization block, where N is 7 or 8, and P is a natural number not greater than 5.

Specifically, how to determine the sending time of the synchronization block, please refer to the subsequent embodiments.

The technical solution provided by the embodiment of the present disclosure is described in the following specific embodiment.

Figure 2A:
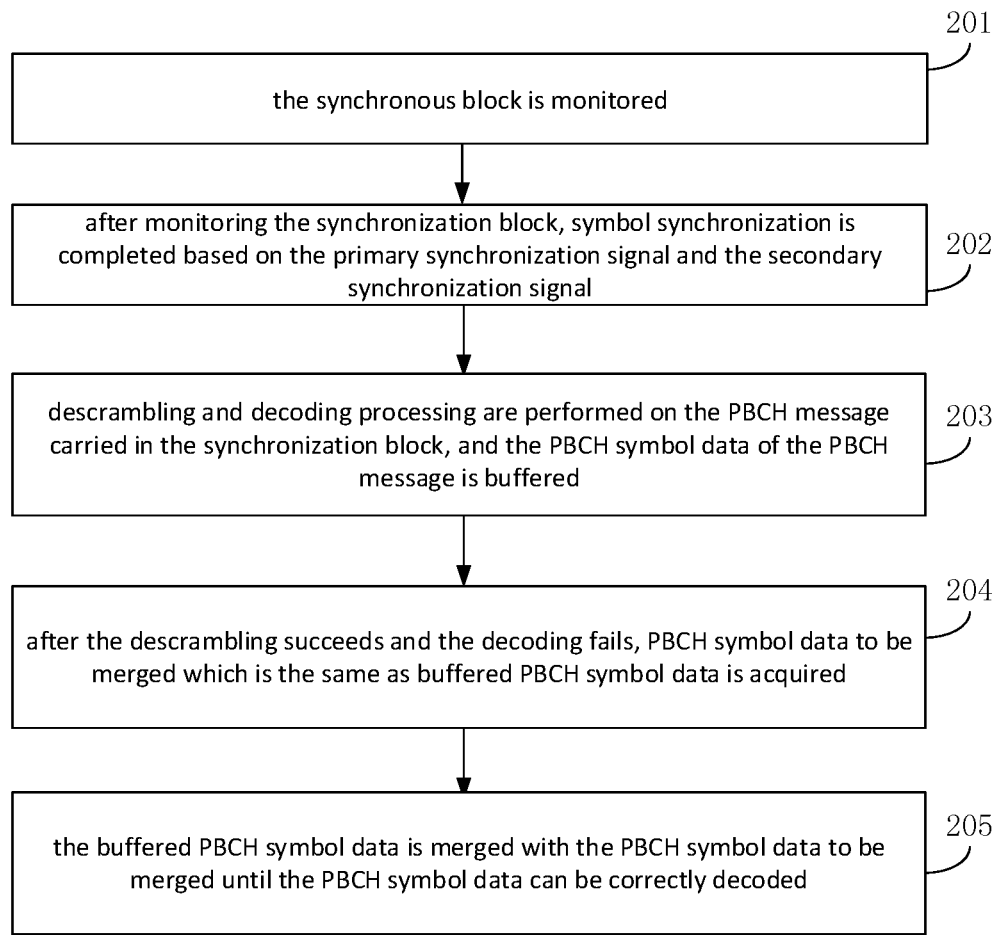
FIG. 2A is a flowchart illustrating another method for determining a sending time of a synchronization block according to an exemplary embodiment.
Figure 2B:
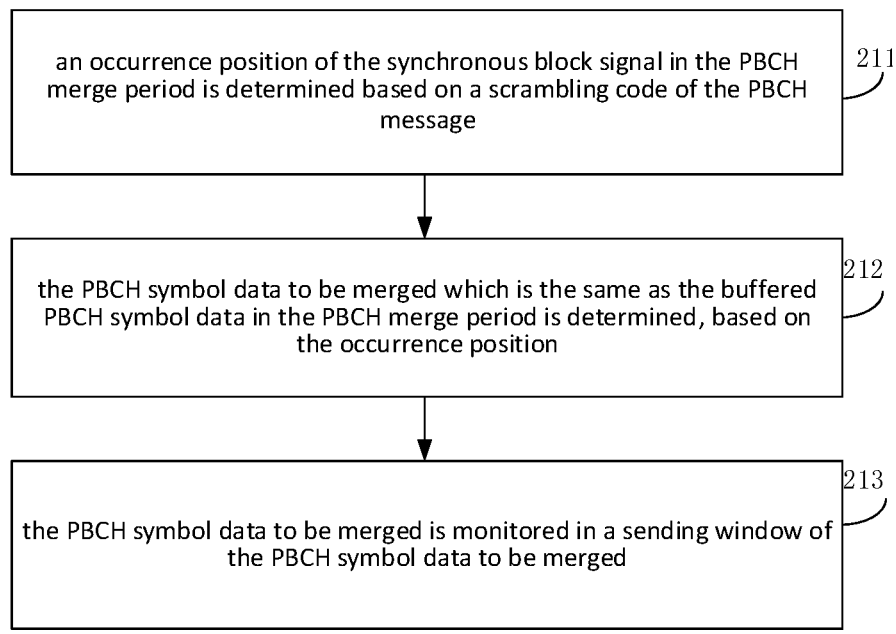
FIG. 2B is a flowchart of a method for acquiring PBCH symbol data to be merged which is the same as buffered PBCH symbol data in the embodiment shown in FIG. 2A.
Figure 2C:
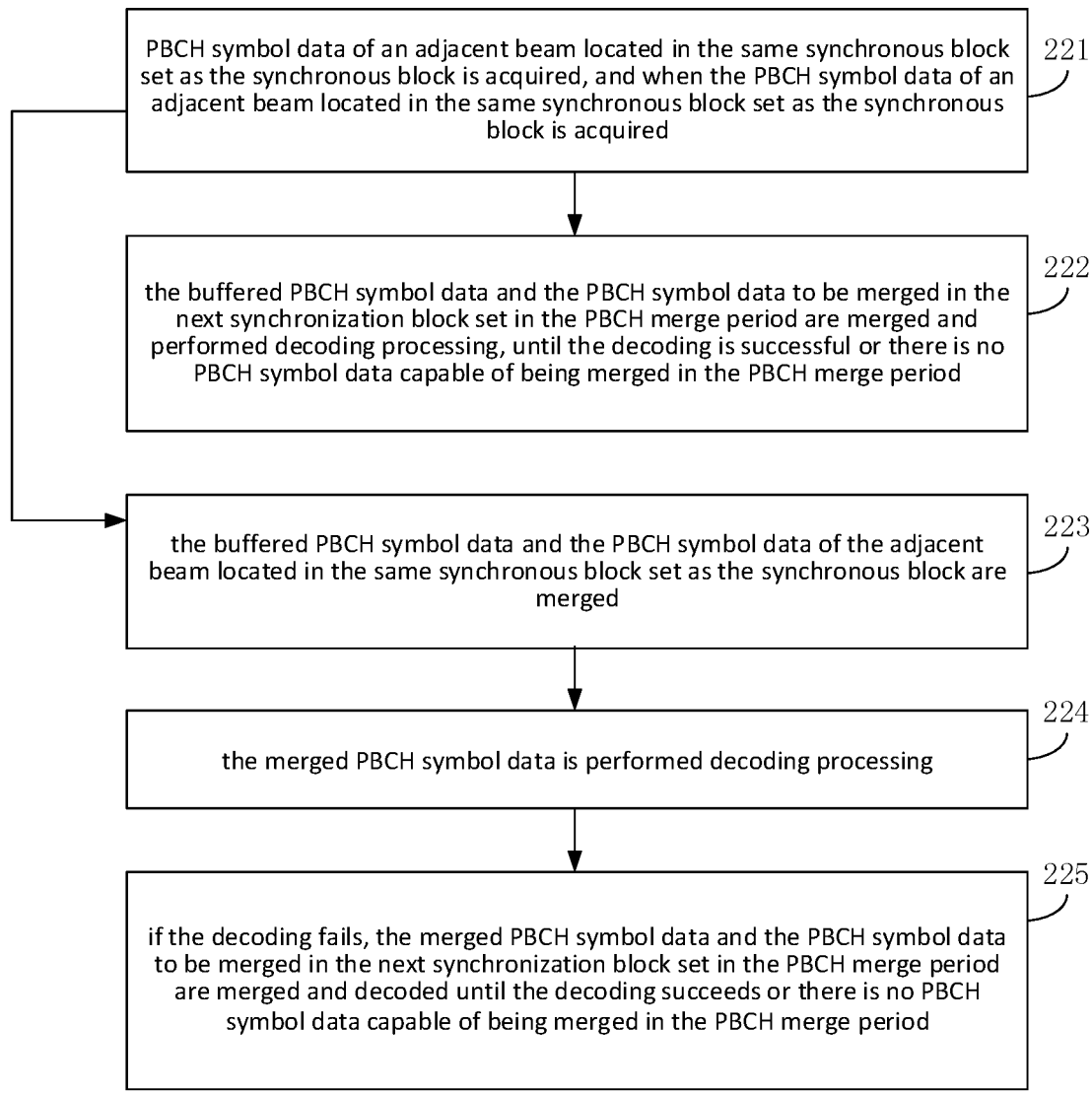
FIG. 2C is a flowchart of a method for merging the buffered PBCH symbol data and the PBCH symbol data to be merged in the embodiment shown in FIG. 2A.

FIG. 2A is a flowchart illustrating another method for determining a sending time of a synchronization block according to an exemplary embodiment, FIG. 2B is a flowchart of a method for acquiring PBCH symbol data to be merged which is the same as buffered PBCH symbol data in the embodiment shown in FIG. 2A, and FIG. 2C is a flowchart of a method for merging the buffered PBCH symbol data and the PBCH symbol data to be merged in the embodiment shown in FIG. 2A. The present embodiment uses the above method provided by the embodiment of the present disclosure to illustrate how the UE determines the sending time of the synchronization block. As shown in FIG. 2A, the following steps are included:

In step 201, the synchronous block is monitored.

In step 202, after monitoring the synchronization block, symbol synchronization is completed based on the primary synchronization signal and the secondary synchronization signal.

In some embodiments, after the synchronization block is received, the primary synchronization signal is first demodulated and decoded, and then the secondary synchronization signal is demodulated and decoded, and symbol synchronization is completed based on the demodulated and decoded primary and secondary synchronization signals.

In step 203, descrambling and decoding processing are performed on the PBCH message carried in the synchronization block, and the PBCH symbol data of the PBCH message is buffered.

In some embodiments, the description of the step 203 may refer to the description of the step 101 of the embodiment shown in FIG. 1A, which is not described in detail herein.

In step 204, after the descrambling succeeds and the decoding fails, PBCH symbol data to be merged which is the same as buffered PBCH symbol data is acquired.

In some embodiments, the method for acquiring PBCH symbol data to be merged which is the same as buffered PBCH symbol data can be seen in the embodiment shown in FIG. 2B. As shown in FIG. 2B, the following steps are included:

in step 211, an occurrence position of the synchronous block signal in the PBCH merge period is determined based on a scrambling code of the PBCH message.

In some embodiments, based on the number of bits of the scrambling code, it may be determined the number of the PBCH messages in the PBCH merge period that are the same, so that the user equipment may determine the occurrence position of the PBCH symbol data in the merge period based on the scrambling code of the received synchronization block. For example, referring to FIG. 1C, the number of bits of the scrambling code is 3 bits, and when the user equipment receives the PBCH symbol data with the scrambling code of 1, it may determine that the exact position of the PBCH symbol data in the 80 ms merge period is carried in the synchronization block labeled 1 in the figure.

In step 212, the PBCH symbol data to be merged which is the same as the buffered PBCH symbol data in the PBCH merge period is determined, based on the occurrence position.

In some embodiments, the PBCH symbol data to be merged includes PBCH symbol data of a beam which is the same as the beam where the synchronous block is located and PBCH symbol data of an adjacent beam in a PBCH merge period.

In step 213, the PBCH symbol data to be merged is monitored in a sending window of the PBCH symbol data to be merged.

In some embodiments, the system may generally make an agreement that the half-frame position sending by the synchronization block of the same cell is kept unchanged, so that after the PBCH symbol data to be merged is determined, a sending window for transmitting the PBCH symbol data to be merged in the next transmission period may be determined, and further, the synchronization block may be monitored within 5 ms of the sending window, and the PBCH symbol data to be merged may be acquired by descrambling.

In step 205, the buffered PBCH symbol data is merged with the PBCH symbol data to be merged until the PBCH symbol data can be correctly decoded.

In some embodiments, the description of step 205 may refer to the embodiment shown in FIG. 2C. As shown in FIG. 2C, the following steps are included:

in step 221, PBCH symbol data of an adjacent beam located in the same synchronous block set as the synchronous block is acquired, and when the PBCH symbol data of an adjacent beam located in the same synchronous block set as the synchronous block is acquired, step 223 is executed, and when PBCH symbol data of an adjacent beam located in the same synchronous block set as the synchronous block is not acquired, step 222 is executed.

For example, referring to FIG. 1C, if the currently buffered PBCH symbol data is PBCH symbol data in a synchronization block with scrambling code being 0 and PBCH symbol data in a synchronization block with scrambling code being 1 of an adjacent beam is monitored, two PBCH symbol data may be merged first.

In step 222, the buffered PBCH symbol data and the PBCH symbol data to be merged in the next synchronization block set in the PBCH merge period are merged and performed decoding processing, until the decoding is successful or there is no PBCH symbol data capable of being merged in the PBCH merge period.

In step 223, the buffered PBCH symbol data and the PBCH symbol data of the adjacent beam located in the same synchronous block set as the synchronous block are merged.

In step 224, the merged PBCH symbol data is performed decoding processing.

In step 225, if the decoding fails, the merged PBCH symbol data and the PBCH symbol data to be merged in the next synchronization block set in the PBCH merge period are merged and decoded until the decoding succeeds or there is no PBCH symbol data capable of being merged in the PBCH merge period.

In the embodiment, through the above steps 201 to 205, it is achieved that the occurrence position of the PBCH symbol data in the merge period can be determined based on the scrambling code of the PBCH message, so as to determine the sending window of the PBCH symbol data to be merged, and obtain the PBCH symbol data to be merged. It is achieved that the TI and the system frame number of the synchronization block are effectively indicated by the PBCH symbol data, and the descrambling complexity for the user equipment is not increased greatly on the basis of achieving the decoding the merged PBCH symbol data.

Figure 3:
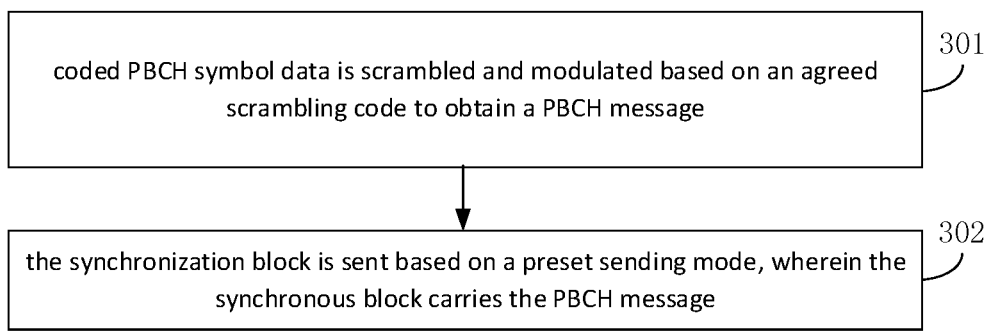
FIG. 3 is a flowchart illustrating a method for determining a sending time of a synchronization block according to an exemplary embodiment.

FIG. 3 is a flowchart illustrating a method for determining a sending time of a synchronization block according to an exemplary embodiment; the method for determining the sending time of the synchronization block can be applied to a base station. As shown in FIG. 3, the method for determining the sending time of the synchronization block includes the following steps 301-302:

in step 301, coded PBCH symbol data is scrambled and modulated based on an agreed scrambling code to obtain a PBCH message.

In some embodiments, the PBCH symbol data includes high N bits and a first low data bit of a system frame number and high P bits of timing index bits of the synchronization block, where P is a natural number not greater than 5

In some embodiments, in addition to the high N bits and the first low data bit of the system frame number, other bits are used as scrambling codes, and the first low data bit of the timing index bits of the synchronization block is used as scrambling codes, which are used for scrambling PBCH symbol data.

In step 302, the synchronization block is sent based on a preset sending mode, wherein the synchronous block carries the PBCH message.

In some embodiments, the preset sending mode may be a first agreed mode, wherein the first agreed mode is used for indicating that the synchronization blocks in each direction is sent based on a punching mode, and the first agreed mode is beneficial to saving the resources of the base station.

In some embodiments, the preset sending mode may be a second agreed mode, wherein the second agreed mode is used for indicating that the synchronization block is sent in each direction in each synchronization block sending period.

In an exemplary scenario, as shown in FIG. 1B, in the scenario shown in FIG. 1B, the base station 10 and the user equipment (e.g. a smart phone, a tablet computer, etc.) 20 are included, wherein the base station 10 may carry the high N bits and a first low data bit of the system frame number and the high P bits of the timing index bits of the synchronization block in PBCH symbol data of a synchronization block, where N is 7 or 8, so that the user equipment 20 may obtain PBCH symbol data to be merged based on the scrambling code when decoding the PBCH fails after receiving the synchronization block. Since the number of the scrambling code bits can be at least two or three bits, it is achieved that the TI and the system frame number of the synchronization block are effectively indicated by the PBCH symbol data, and the descrambling complexity for the user equipment is not increased greatly on the basis of achieving the decoding the merged PBCH symbol data.

Through the above steps 301-303, the present embodiment can achieve that the TI and the system frame number of the synchronization block are effectively indicated by the PBCH symbol data, and the descrambling complexity for the user equipment is not increased greatly on the basis of achieving the decoding the merged PBCH symbol data.

In some embodiments, the sending the synchronous block based on a preset sending mode includes:

sending the synchronization blocks based on a first agreed mode, wherein the first agreed mode is used for indicating that the synchronization blocks in each direction is sent based on a punching mode; or, sending the synchronization block based on a second agreed mode, wherein the second agreed mode is used for indicating that the synchronization block is sent in each direction in each synchronization block sending period.

In some embodiments, N is 7 or 8.

Specifically, how to determine the sending time of the synchronization block, please refer to the subsequent embodiments.

The technical solution provided by the embodiment of the present disclosure is described in the following specific embodiment.

Figure 4:
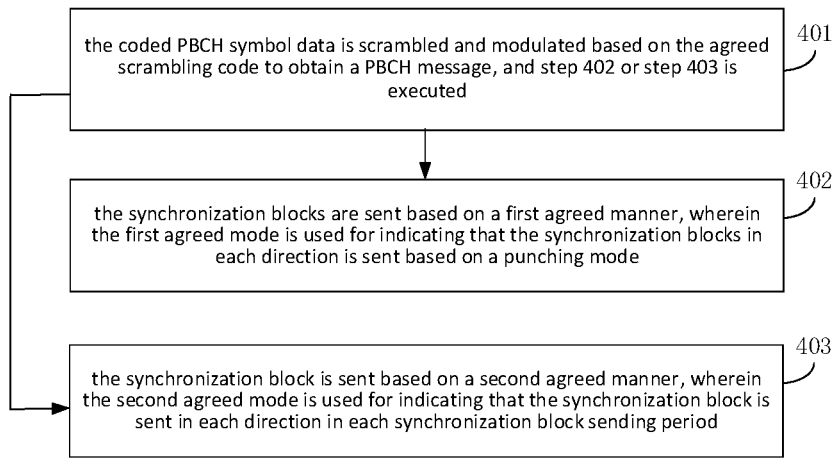
FIG. 4 is a flowchart illustrating another method for determining a sending time of a synchronization block according to an exemplary embodiment.

FIG. 4 is a flowchart illustrating another method for determining a sending time of a synchronization block according to an exemplary embodiment; the present embodiment uses the above method provided by the embodiment of the present disclosure to exemplify how to send a synchronization block as an example. As shown in FIG. 4, and the following steps are included:

in step 401, the coded PBCH symbol data is scrambled and modulated based on the agreed scrambling code to obtain a PBCH message, and step 402 or step 403 is executed.

In some embodiments, the PBCH symbol data includes high N bits and a first low data bit of a system frame number and high P bits of the timing index bits of the synchronization block, where N is 7 or 8, and P is a natural number not greater than 5.

In step 402, the synchronization blocks are sent based on a first agreed manner, wherein the first agreed mode is used for indicating that the synchronization blocks in each direction is sent based on a punching mode.

In some embodiments, when N is 7, the PDCH merge period length is 80 ms, and there are 8 PBCH symbol data capable of being merged, and generally, the PBCH can be successfully decoded without being merged with so much PBCH symbol data, so a puncturing manner can be used to transmit the synchronization block in each direction. Referring to FIG. 1C, in the period of 80 ms, only the synchronization blocks labeled 0, 1, 4, and 5 can be transmitted in a certain direction, while the synchronization blocks labeled 2, 3, 6, and 7 are not transmitted, thereby saving the resources of the base station.

In some embodiments, when N is 8, the synchronization block is not usually sent in the first agreed manner in order to ensure effective merging of the PBCH symbol data.

In step 403, the synchronization block is sent based on a second agreed manner, wherein the second agreed mode is used for indicating that the synchronization block is sent in each direction in each synchronization block sending period.

In some embodiments, the synchronization block may be sent in the second agreed manner when N is 7 or N is 8.

In the embodiment, through the above steps 401-403, the base station may puncture the transmission of the synchronization block according to the energy saving requirement, that is, the synchronization block is sent in the first agreed manner. On the basis of achieving the decoding the merged PBCH symbol data, the resources of the base station may be saved.

Figure 5:
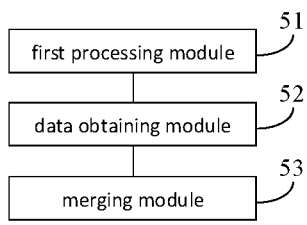
FIG. 5 is a block diagram illustrating a device for determining a sending time of a synchronization block according to an exemplary embodiment.

FIG. 5 is a block diagram illustrating a device for determining a sending time of a synchronization block, which is applied to a user equipment. As shown in FIG. 5, the device for determining a sending time of a synchronization block includes:

a first processing module 51, configured to perform descrambling and decoding processing on a PBCH message carried in the synchronization block, and buffer PBCH symbol data of the PBCH message before demodulation;

a data obtaining module 52, configured to acquire PBCH symbol data to be merged which is the same as buffered PBCH symbol data after the successful descrambling and the failed decoding performed by the first processing module, wherein the PBCH symbol data to be merged includes PBCH symbol data of a beam which is the same as the beam where the synchronous block is located and PBCH symbol data of an adjacent beam in a PBCH merge period; and a merging module 53 is configured to merge the buffered PBCH symbol data and the PBCH symbol data to be merged, which is acquired by the data module, until the PBCH symbol data can be decoded correctly.

Figure 6:
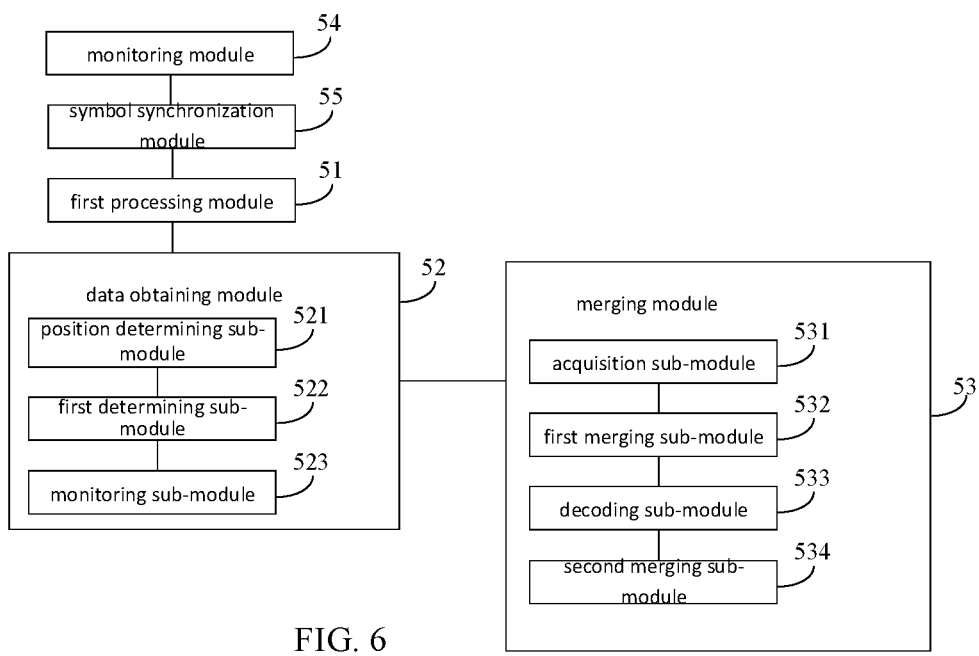
FIG. 6 is a block diagram illustrating another device for determining a sending time of a synchronization block according to an exemplary embodiment.

FIG. 6 is a block diagram illustrating another device for determining a sending time of a synchronization block. As shown in FIG. 6, on the basis of the embodiment shown in FIG. 5, the data acquisition module 52 includes:

a position determining sub-module 521, configured to determine an occurrence position of the synchronous block signal in the PBCH merge period based on a scrambling code of the PBCH message;

a first determining sub-module 522, configured to determine the PBCH symbol data to be merged which is the same as the buffered PBCH symbol data in the PBCH merge period, based on the occurrence position; and a monitoring sub-module 523, configured to monitor the PBCH symbol data to be merged in a sending window of the PBCH symbol data to be merged.

In some embodiments, the merge module 53 includes:

an acquisition sub-module 531, configured to acquire PBCH symbol data of an adjacent beam located in the same synchronous block set as the synchronous block;

a first merging sub-module 532, configured to merge the buffered PBCH symbol data and the PBCH symbol data of the adjacent beam located in the same synchronous block set as the synchronous block after acquiring the PBCH symbol data of the adjacent beam in the same synchronous block set;

a decoding sub-module 533, configured to decode the PBCH symbol data merged by the first merging sub-module; and a second merging sub-module 534, configured to merge and decode the merged PBCH symbol data and PBCH symbol data to be merged in the next synchronous block set in the PBCH merge period until the decoding succeeds or there is no PBCH symbol data capable of being merged in the PBCH merge period, if the decoding fails.

In some embodiments, when the scrambling code bits are 2 bits system frame number bits and a 1-bit timing index bit of the synchronization block, the PBCH merge period is 80 ms.

In some embodiments, when the scrambling code bits are 1-bit system frame number bits and 1-bit timing index bit of the synchronization blocks, the PBCH merge period is 40 ms.

In some embodiments, the device further includes:

a monitoring module 54, configured to monitor the synchronization block; and a symbol synchronization module 55, configured to complete symbol synchronization based on the primary synchronization signal and the secondary synchronization signal after the synchronization block is monitored by the monitoring module.

In some embodiments, the PBCH symbol data includes high N bits and a first low data bit of a system frame number and high P bits of the timing index bits of the synchronization block, where N is 7 or 8, and P is a natural number not greater than 5.

Figure 7:
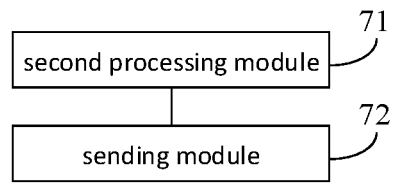
FIG. 7 is a block diagram illustrating a device for determining a sending time of a synchronization block according to an exemplary embodiment.

FIG. 7 is a block diagram illustrating a device for determining a sending time of a synchronization block according to an exemplary embodiment, which is applied to a base station. As shown in FIG. 7, the device for determining a sending time of a synchronization block includes:

a second processing module 71, configured to scramble and modulate coded PBCH symbol data based on an agreed scrambling code to obtain a PBCH message, wherein the PBCH symbol data includes high N bits and a first low data bit of a system frame number and high P bits of timing index bits of the synchronization block, where P is a natural number not greater than 5; and a sending module 72, configured to send the synchronous block based on a preset sending mode, wherein the synchronous block carries the PBCH message.

Figure 8:
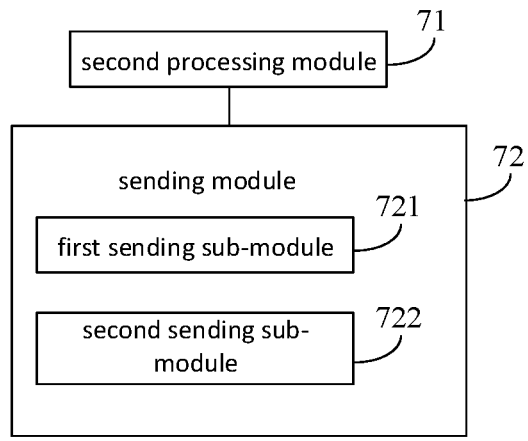
FIG. 8 is a block diagram illustrating another device for determining a sending time of a synchronization block according to an exemplary embodiment.

FIG. 8 is a block diagram illustrating another device for determining a sending time of a synchronization block according to an exemplary embodiment. As shown in FIG. 8, on the basis of the embodiment shown in FIG. 7.

In some embodiments, the sending module 72 includes:

a first sending sub-module 721, configured to send the synchronization block based on a first agreed manner, wherein the first agreed mode is used for indicating that the synchronization blocks in each direction is sent based on a punching mode; or, a second sending sub-module 722, configured to send the synchronization block based on a second agreed mode, wherein the second agreed mode is used for indicating that the synchronization block is sent in each direction in each synchronization block sending period.

In some embodiments, N is 7 or 8.

The specific manner in which the various modules perform the operations with respect to the device in the above embodiments has been described in detail with respect to embodiments of the method and will not be explained in detail herein.

The various device components, units, blocks, or portions may have modular configurations, or are composed of discrete components, but nonetheless can be referred to as "modules" in general. In other words, the "components," "modules" or "units" referred to herein may or may not be in modular forms.

Figure 9:
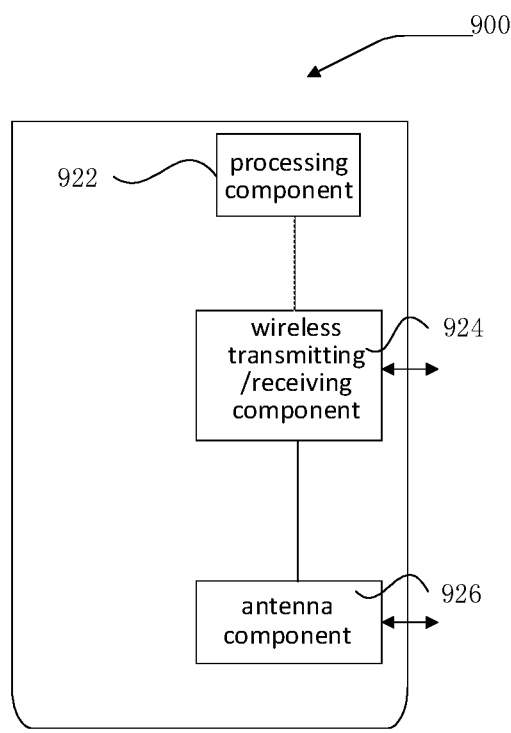
FIG. 9 is a block diagram illustrating a device adapted to determine a sending time of a synchronization block according to an exemplary embodiment.

FIG. 9 is a block diagram illustrating a device adapted to determine a sending time of a synchronization block according to an exemplary embodiment. The device 900 may be provided as a base station. Referring to FIG. 9, the device 900 includes a processing component 922, a wireless transmitting/receiving component 924, an antenna component 926, and a signal processing portions specific to the wireless interface. The processing component 922 may further include one or more processors.

One of the processors in the processing component 922 may be configured to perform the above method for determining a sending time of a synchronization block.

In some embodiments, a non-transitory computer readable storage medium comprising instructions is provided, wherein the instructions can be executed by the processing component 922 of the device 900 to perform the method described in the second aspect above. For example, the non-transitory computer-readable storage medium may be a ROM, a random-access memory (RAM), a CD-ROM, a magnetic tape, a floppy disk, an optical data storage device, and the like.

Figure 10:
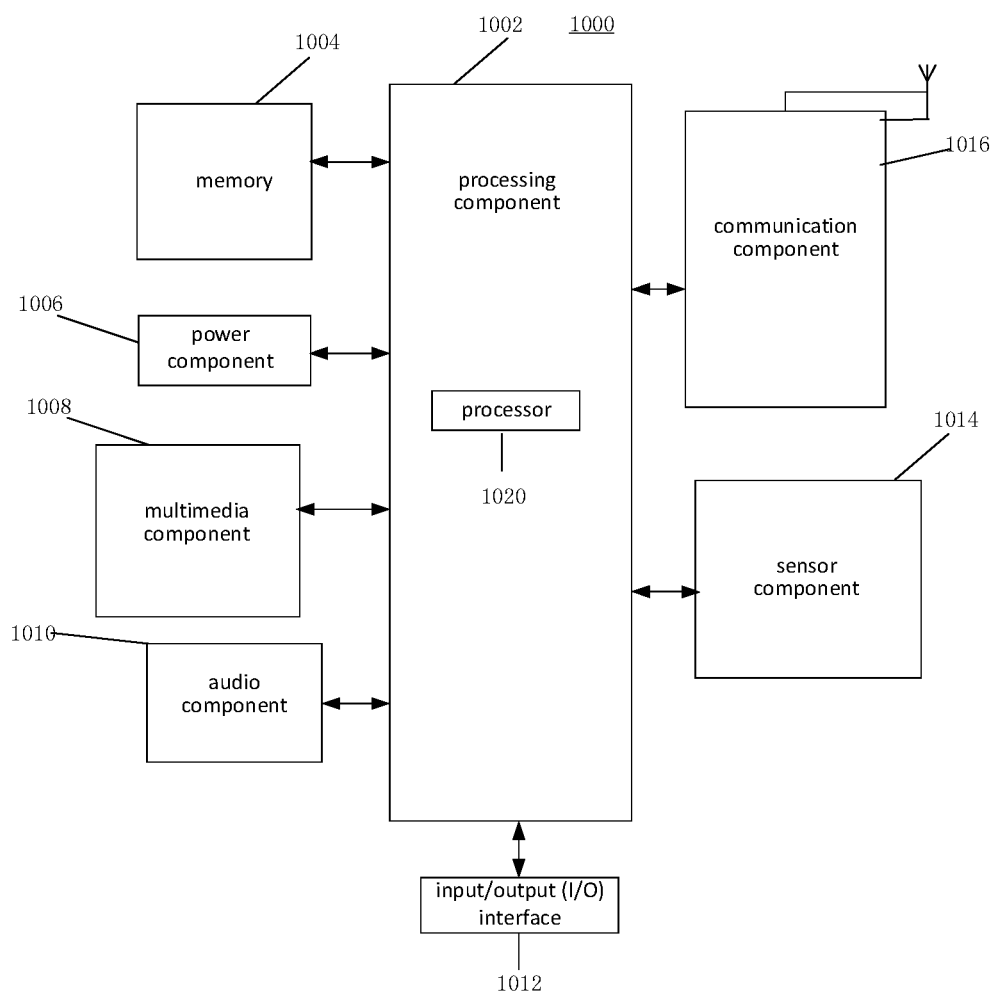
FIG. 10 is a block diagram illustrating a device adapted to determine a sending time of a synchronization block according to an exemplary embodiment.

FIG. 10 is a block diagram illustrating a device adapted to determine a sending time of a synchronization block according to an exemplary embodiment. For example, the device 1000 may be a mobile device, such as a smartphone.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the device 1000, such as the operations associated with display, telephone calls, data communications, camera operations, and recording operations. The processing component 1002 can include one or more processors 1020 to execute instructions to perform all or part of the steps in the above described methods. Moreover, the processing component 1002 can include one or more modules to facilitate the interaction between the processing component 1002 and other components. For example, the processing component 1002 can include a multimedia module to facilitate the interaction between the multimedia component 1008 and the processing component 1002.

The memory 1004 is configured to store various types of data to support the operation of the device 1000. Examples of such data include instructions for any application or method operated on device 1000, such as the contact data, the phone book data, messages, pictures, videos, and the like. The memory 1004 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 can include a power management system, one or more power sources, and other components associated with the generation, management, and distribution of power in the device 1000.

The multimedia component 1008 includes a screen providing an output interface between the device 1000 and the user t. In some embodiments, the screen can include a liquid crystal display (LCD) and a touch panel (TP). In some embodiments, the screen can be other types of displays, such as organic light-emitting diode (OLED) displays.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. When the device 1000 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1010 is configured to output and/or input an audio signal. For example, the audio component 1010 includes a microphone (MIC) configured to receive an external audio signal when the device 1000 is in an operation mode, such as a call mode, a recording mode, and a voice recognition mode. The received audio signal may be further stored in the memory 1004 or sent via the communication component 1016. In some embodiments, the audio component 1010 also includes a speaker for outputting the audio signal.

The I/O interface 1012 provides an interface between the processing component 1002 and peripheral interface modules, such as a keyboard, a click wheel, buttons, and the like. These buttons may include, but are not limited to, a home button, a volume button, a starting button, and a locking button.

The sensor component 1014 includes one or more sensors for providing status assessments of various aspects of the device 1000. For example, the sensor component 1014 can detect an open/closed status of the device 1000, relative positioning of components, such as the display and the keypad of the device 1000. The sensor component 1014 can also detect a change in position of one component of the device 1000 or the device 1000, the presence or absence of user contact with the device 1000, an orientation, or an acceleration/deceleration of the device 1000, and a change in temperature of the device 1000. The sensor component 1014 can include a proximity sensor configured to detect the presence of nearby objects without any physical contact. The sensor component 1014 can also include a light sensor, such as a CMOS or CCD image sensor, configured to use in imaging applications. In some embodiments, the sensor component 1014 can also include an accelerometer sensor, a gyroscope sensor, a magnetic sensor, a pressure sensor, or a temperature sensor.

The communication component 1016 is configured to facilitate wired or wireless communication between the device 1000 and other devices. The device 1000 can access a wireless network based on a communication standard, such as WiFi, 2G or 3G, or a combination thereof.

In some embodiments, the communication component 1016 receives broadcast signals or broadcast associated information from an external broadcast management system via a broadcast channel.

In some embodiments, the communication component 1016 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 1000 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, for performing the method for determining a sending time of a synchronization block described above.

In some embodiments, there is also provided a non-transitory computer-readable storage medium including instructions, such as a memory 1004 including instructions executable by the processor 1020 of the device 1000 to perform the above described method. For example, the non-transitory computer readable storage medium may be a ROM, a random-access memory (RAM), a CD-ROM, a magnetic tape, a floppy disc, and an optical data storage device.

Various embodiments of the present disclosure can have one or more of the following advantages.

The base station can carry the high N bits and the a Mth low data bit of the system frame number and the high P bits of the timing index bits of the synchronization block in the PBCH symbol data of the synchronization block, wherein N is 7 or 8, so that the user equipment can obtain the PBCH symbol data to be merged based on the scrambling code when the PBCH fails to be decoded after receiving the synchronization block. Since the number of the scrambling code bits can be at least two or three bits, it is achieved that the TI and the system frame number of the synchronization block are effectively indicated by the PBCH symbol data, and the descrambling complexity for the user equipment is not increased greatly on the basis of achieving the decoding the merged PBCH symbol data.

In the present disclosure, it is to be understood that the terms "lower," "upper," "front," "back," "left," "right," "top," "bottom," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the methods and operations can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for determining a sending time of a synchronous block, comprising:

performing descrambling and decoding processing on a PBCH message carried in the synchronous block, and buffering PBCH symbol data of the PBCH message before demodulation;

after the descrambling succeeds and the decoding fails, acquiring PBCH symbol data to be merged, which are same as buffered PBCH symbol data, wherein the PBCH symbol data to be merged comprise PBCH symbol data of a beam, which is same as a beam where the synchronous block is located, and PBCH symbol data of an adjacent beam, during a PBCH merge period; and merging the buffered PBCH symbol data and the PBCH symbol data to be merged until the PBCH symbol data can be correctly decoded, the merging comprising:

acquiring the PBCH symbol data of the adjacent beam located in the same synchronous block set as the synchronous block;

merging the buffered PBCH symbol data and the PBCH symbol data of the adjacent beam located in the same synchronous block set as the synchronous block, after acquiring the PBCH symbol data of the adjacent beam in the same synchronous block set;

performing decoding processing on merged PBCH symbol data; and merging and decoding the merged PBCH symbol data and PBCH symbol data to be merged in a next synchronous block set in the PBCH merge period until the decoding succeeds or there is no PBCH symbol data capable of being merged in the PBCH merge period in a case where the decoding fails, wherein the PBCH symbol data includes high N bits and a first low data bit of a system frame number and high P bits of timing index bits of the synchronization block, where N is 7 or 8, and P is a natural number not greater than 5.

2. The method of claim 1, wherein the acquiring PBCH symbol data to be merged which is the same as buffered PBCH symbol data comprises:

determining an occurrence position of a synchronous block signal in the PBCH merge period based on a scrambling code of the PBCH message;

determining the PBCH symbol data to be merged which is the same as the buffered PBCH symbol data in the PBCH merge period, based on the occurrence position; and monitoring the PBCH symbol data to be merged in a sending window of the PBCH symbol data to be merged.

3. The method of claim 1, wherein scrambling code bits are 2bits system frame number bits and a 1 bit timing index bit of the synchronization block, and the PBCH merge period is 80 ms.

4. The method of claim 1, wherein scrambling code bits are 1 bit system frame number bit and a 1 bit timing index bit of the synchronization block, and the PBCH merge period is 40 ms.

5. The method of claim 1, wherein before the performing descrambling and decoding processing on a PBCH message carried in the synchronous block, the method further comprises:
- monitoring the synchronization block; and
- completing symbol synchronization based on a primary synchronization signal and a secondary synchronization signal after monitoring the synchronization block.

6. A user equipment, comprising:
- a processor; and
- a memory for storing instructions executable for the processor;
- wherein the processor is configured to executing a method for determining a sending time of a synchronous block, the method comprising:
- performing descrambling and decoding processing on a PBCH message carried in the synchronous block, and buffering PBCH symbol data of the PBCH message before demodulation;
- after the descrambling succeeds and the decoding fails, acquiring PBCH symbol data to be merged, which are same as buffered PBCH symbol data, wherein the PBCH symbol data to be merged comprises PBCH symbol data of a beam, which is same as a beam where the synchronous block is located, and PBCH symbol data of an adjacent beam, during a PBCH merge period; and
- merging the buffered PBCH symbol data and the PBCH symbol data to be merged until the PBCH symbol data can be correctly decoded, the merging comprising:
- acquiring the PBCH symbol data of the adjacent beam located in the same synchronous block set as the synchronous block;
- merging the buffered PBCH symbol data and the PBCH symbol data of the adjacent beam located in the same synchronous block set as the synchronous block, after acquiring the PBCH symbol data of the adjacent beam in the same synchronous block set;
- performing decoding processing on merged PBCH symbol data; and
- merging and decoding the merged PBCH symbol data and PBCH symbol data to be merged in a next synchronous block set in the PBCH merge period until the decoding succeeds or there is no PBCH symbol data capable of being merged in the PBCH merge period in a case where the decoding fails,
- wherein the PBCH symbol data includes high N bits and a first low data bit of a system frame number and high P bits of timing index bits of the synchronization block, where N is 7 or 8, and P is a natural number not greater than 5.

7. The user equipment of claim 6, wherein the acquiring PBCH symbol data to be merged which is the same as buffered PBCH symbol data comprises:
- determining an occurrence position of a synchronous block signal in the PBCH merge period based on a scrambling code of the PBCH message;
- determining the PBCH symbol data to be merged which is the same as the buffered PBCH symbol data in the PBCH merge period, based on the occurrence position; and
- monitoring the PBCH symbol data to be merged in a sending window of the PBCH symbol data to be merged.

8. The user equipment of claim 6, wherein scrambling code bits are 2bits system frame number bits and a 1 bit timing index bit of the synchronization block, and the PBCH merge period is 80 ms.

9. The user equipment of claim 6, wherein scrambling code bits are 1 bit system frame number bit and a 1 bit timing index bit of the synchronization block, and the PBCH merge period is 40 ms.

10. The user equipment of claim 6, wherein before the performing descrambling and decoding processing on a PBCH message carried in the synchronous block, the method further comprises:
- monitoring the synchronization block; and
- completing symbol synchronization based on a primary synchronization signal and a secondary synchronization signal after monitoring the synchronization block.

11. A non-transitory computer-readable storage medium, having stored thereon computer instructions stored thereon which, when being executed by a processor, cause the processor to perform the following steps:
- performing descrambling and decoding processing on a PBCH message carried in the synchronous block, and buffering PBCH symbol data of the PBCH message before demodulation;
- after the descramblinq succeeds and the decoding fails, acquiring PBCH symbol data to be merged, which are same as buffered PBCH symbol data, wherein the PBCH symbol data to be merged comprise PBCH symbol data of a beam, which is same as a beam where the synchronous block is located, and PBCH symbol data of an adjacent beam, during a PBCH merge period; and
- merging the buffered PBCH symbol data and the PBCH symbol data to be merged until the PBCH symbol data can be correctly decoded, the merging comprising:
- acquiring the PBCH symbol data of the adjacent beam located in the same synchronous block set as the synchronous block;
- merging the buffered PBCH symbol data and the PBCH symbol data of the adjacent beam located in the same synchronous block set as the synchronous block, after acquiring the PBCH symbol data of the adjacent beam in the same synchronous block set;
- performing decoding processing on merged PBCH symbol data; and
- merging and decoding the merged PBCH symbol data and PBCH symbol data to be merged in a next synchronous block set in the PBCH merge period until the decoding succeeds or there is no PBCH symbol data capable of being merged in the PBCH merge period in a case where the decoding fails,
- wherein the PBCH symbol data includes high N bits and a first low data bit of a system frame number and high P bits of timing index bits of the synchronization block, where N is 7 or 8, and P is a natural number not greater than 5.

12. The storage medium of claim 11, wherein the acquiring PBCH symbol data to be merged which is the same as buffered PBCH symbol data comprises:
- determining an occurrence position of a synchronous block signal in the PBCH merge period based on a scrambling code of the PBCH message;
- determining the PBCH symbol data to be merged which is the same as the buffered PBCH symbol data in the PBCH merge period, based on the occurrence position; and monitoring the PBCH symbol data to be merged in a sending window of the PBCH symbol data to be merged.

13. The storage medium of claim 11, wherein scrambling code bits are 2bits system frame number bits and a 1 bit timing index bit of the synchronization block, and the PBCH merge period is 80 ms.

14. The storage medium of claim 11, wherein scrambling code bits are 1 bit system frame number bit and a 1 bit timing index bit of the synchronization block, and the PBCH merge period is 40 ms.

15. The storage medium of claim 11, wherein before the performing descrambling and decoding processing on a PBCH message carried in the synchronous block, the processor is caused to perform the following steps:
monitoring the synchronization block; and
completing symbol synchronization based on a primary synchronization signal and a secondary synchronization signal after monitoring the synchronization block.

* * * * *